United States Patent [19]
Sjölinder et al.

[11] Patent Number: 5,715,338
[45] Date of Patent: Feb. 3, 1998

[54] IMPERMEABLE ENCAPSULATION OF OPTOELECTRONIC COMPONENTS

[75] Inventors: Sven Sjölinder, Hägersten; Odd Steijer, Bromma; Goran Palmskog, Jarfalla, all of Sweden

[73] Assignee: Telefonaktiebolaget LM Ericcson, Stockholm, Sweden

[21] Appl. No.: 722,118

[22] PCT Filed: Mar. 20, 1995

[86] PCT No.: PCT/SE95/00282

§ 371 Date: Sep. 18, 1996

§ 102(e) Date: Sep. 18, 1996

[87] PCT Pub. No.: WO95/25975

PCT Pub. Date: Sep. 28, 1995

[30] Foreign Application Priority Data

Mar. 18, 1994 [SE] Sweden .................. 9400885

[51] Int. Cl.⁶ .................................................. G02B 6/36
[52] U.S. Cl. .................. 385/14; 385/89; 385/94
[58] Field of Search ..................... 385/14, 88–94, 385/49

[56] References Cited

U.S. PATENT DOCUMENTS

| | | | |
|---|---|---|---|
| 5,059,475 | 10/1991 | Sun et al. | 428/195 |
| 5,076,654 | 12/1991 | Presby | 385/14 |
| 5,077,878 | 1/1992 | Armiento et al. | 437/906 |
| 5,091,045 | 2/1992 | Froning et al. | 216/24 |
| 5,134,671 | 7/1992 | Koern et al. | 385/14 |
| 5,155,777 | 10/1992 | Angelopoulos et al. | 385/14 |
| 5,163,108 | 11/1992 | Armieto et al. | 385/89 |
| 5,467,415 | 11/1995 | Presby | 385/14 |

FOREIGN PATENT DOCUMENTS

| | | |
|---|---|---|
| 0 171 615 | 2/1986 | European Pat. Off. . |
| 0 226 296 | 6/1987 | European Pat. Off. . |
| 0 313 956 | 5/1989 | European Pat. Off. . |
| 0 331 338 | 9/1989 | European Pat. Off. . |
| 0 571 924 | 12/1993 | European Pat. Off. . |
| 3928 824 | 3/1991 | Germany . |

*Primary Examiner*—John Ngo
*Attorney, Agent, or Firm*—Burns, Doane, Swecker & Mathis, L.L.P.

[57] ABSTRACT

An impermeable encapsulated optocomponent and a method for encapsulating an optocomponent includes providing a base, preferably of silicon, supporting waveguides and an optoelectronic component optically coupled to each other. The optoelectronic component is connected to electric driver circuits. Thereafter a silica layer is deposited over a region of the substrate including at least the coupling of the waveguide and optoelectronic component, after which it is encapsulated by applying a layer of curable plastics material. The deposition of silica provides an impermeable inner encapsulation layer and prevents, when applying the curable plastics material, plastics from penetrating between the inner ends of the waveguides and the optoelectronic component, and thus the optical coupling is secured therebetween.

12 Claims, 3 Drawing Sheets

IMPERMEABLE ENCAPSULATION OF OPTOELECTRONIC COMPONENTS

FIELD OF THE INVENTION

The present invention relates to a method for producing an encapsulation of waveguides and optoelectronic components hybrid integrated on silicon bases and it also relates to the encapsulated components.

BACKGROUND OF THE INVENTION

Hybrid integration on silicon is a method of providing a micro-construction procedure of combining in an efficient way waveguides, electronic circuitry, light sources (lasers, light emitting diodes) and light detectors.

The fundamental idea is to use silicon as a base or a substrate and thus use the good mechanical, electrical and thermal properties of this material. On this substrate the optoelectronic components (lasers, light emitting diodes, light detectors, PIN-diodes) and possible electronic circuits are mounted. Silicon is also an excellent substrate for waveguides of for example silicon dioxide. Silicon can be worked by means of lithographically defined masks and various etching methods, such as anisotropical etching, which give a possibility of producing guide bosses (mesas) and V-grooves in order to position, with a high degree of accuracy, optoelectronic components, fibers, or exterior guide means such as guide pins in MT-connectors. The technique promises very much in regard of achieving a low cost of manufacture for optical transmitter and receiver modules. There is a need for a rational encapsulation method which is less costly than the traditional hermetic encapsulation. The previously known encapsulation methods have high demands on the process and on the materials, resulting in the high costs. It would be advantageous if the components could be encapsulated in the same way as conventional microelectronic circuits, that is by transfer molding of curable resins, but then an encapsulation is obtained which in many cases is not sufficiently impermeable.

PRIOR ART

U.S. Pat. Nos. 5,077,878 and 5,163,108 for Armiento et al. disclose how optical receiving elements such as fibers are aligned to active elements of a light generating chip by forming pedestals or projections on the surface of a substrate body of preferably silicon. The optical fibers are positioned in V-grooves in the surface of the substrate and are fabricated by photolithographic techniques.

In the published European patent application EP-A2 0 171 615 a multitude of various embodiments of optocircuits, hybrid integrated on silicon bases with associated electronic circuits are described and methods for the manufacture thereof. The manufacturing method can comprise the conventional deposition and etching procedures for producing integrated circuits, among other steps comprising that a layer of silica glass is deposited and that parts thereof are removed. Further, the components can be encapsulated in the same way as conventional electronic integrated circuits.

In the published European patent application EP-A2 0 331 338 optoelectronic, hybrid integrated circuits are disclosed comprising optoelectronic substrate plates, such as Group III-V lasers 16 and photodiodes 24, 28, mounted on a silicon base and optically connected to each other by silica waveguides 14, 22, 26 and couplers 20, 23 integrated on the base. In FIGS. 6 and 7 it is shown how the upper cladding 34 is formed by depositing silica. Further, a lid 70 can be mounted which is sealed along its circumference against the base. The lid 70 is made of semiconducting material, probably silicon.

U.S. Pat. No. 5,155,777 relates to a scattered light blocking layer for optoelectronic receivers. There, deposition of silicon dioxide is not considered but a deposition of a light sensitive layer of a polymer material.

U.S. Pat. No. 5,059,475 is concerned with forming optical waveguides on metallized substrates and describes among other things the deposition of various layers.

SUMMARY OF THE INVENTION

It is an object of the invention to provide a method for obtaining, within the frame given by conventional encapsulation methods for microelectronic circuits, comprising among other methods transfer molding of plastics, a cost efficient encapsulation, which is sufficiently impermeable for most needs, of waveguides and optoelectronic devices, which are hybrid integrated on a silicon base.

The needs mentioned above are fulfilled by and this object is achieved by the invention, the characteristics of which are set out in the appended claims.

The impermeable encapsulation is achieved by first arranging waveguides and optoelectronic components on a base of silicon and optically connecting them to each other. The optoelectronic components are connected electrically. After that a silica layer is deposited on top of a portion of the substrate, after which the substrate at last, in the conventional way, is encapsulated by for instance transfer molding of a curable resin. The deposition of silicon dioxide serves at least two objects: 1) gives a hermetic encapsulation and 2) in the transfer molding of curable resin it prevents plastics material to penetrate between waveguides and an optoelectronic component, that is an optical contact is ensured. Together with silica waveguides the silicon dioxide layer can also achieve a third object, that is 3) form an upper cladding portion for waveguides on the base.

In the production of an encapsulated, impermeable optocomponent, generally the following steps are performed: First on/in a surface of a plate of an inorganic material, in particular a silicon plate or ceramic plate or a plate of similar kind, various regions for at least partly forming at least one wave guide are produced. The manufacture of the waveguide portions is made so that they are integrated with the surface of the plate. It can be made by means of various process technological methods used in the production of integrated microelectronic circuits and micromechanical devices and comprises deposition of various kinds, diffusion, oxidation, doping, other chemical processing, etching through masks which can be lithographically coated or defined in other ways, etching, etc. The term "process technological methods" will be used hereinafter for designating such processes.

Then a discrete optoelectric component is attached to the surface of the plate where the waveguide portions have been formed and at a place so that the component will be optically coupled to an end of at least one waveguide when the fabrication thereof is finished. Over at least the connection region between the end of this waveguide and the optoelectric component and preferably also over all of this component a silicon dioxide layer is coated, in particular deposited. Finally the assembly formed in that way is covered by molding a curable resin and advantageously the whole assembly is covered by molding into a curable resin.

The silicon dioxide layer can be used for forming an upper cladding portion in the waveguides and it is then coated over corresponding regions of previously produced lower portions and cores of the waveguides. Alternatively the waveguides can comprise previously manufactured optical silica fibers. In the surface of the plate there may be etched, well-defined guide grooves for guide pins and/or for positioning waveguides.

DESCRIPTION OF THE DRAWINGS

The invention will now be described in more detail with reference to non limiting embodiments and with reference to the accompanying drawings in which.

DESCRIPTION OF PREFERRED EMBODIMENTS

Figure 1:
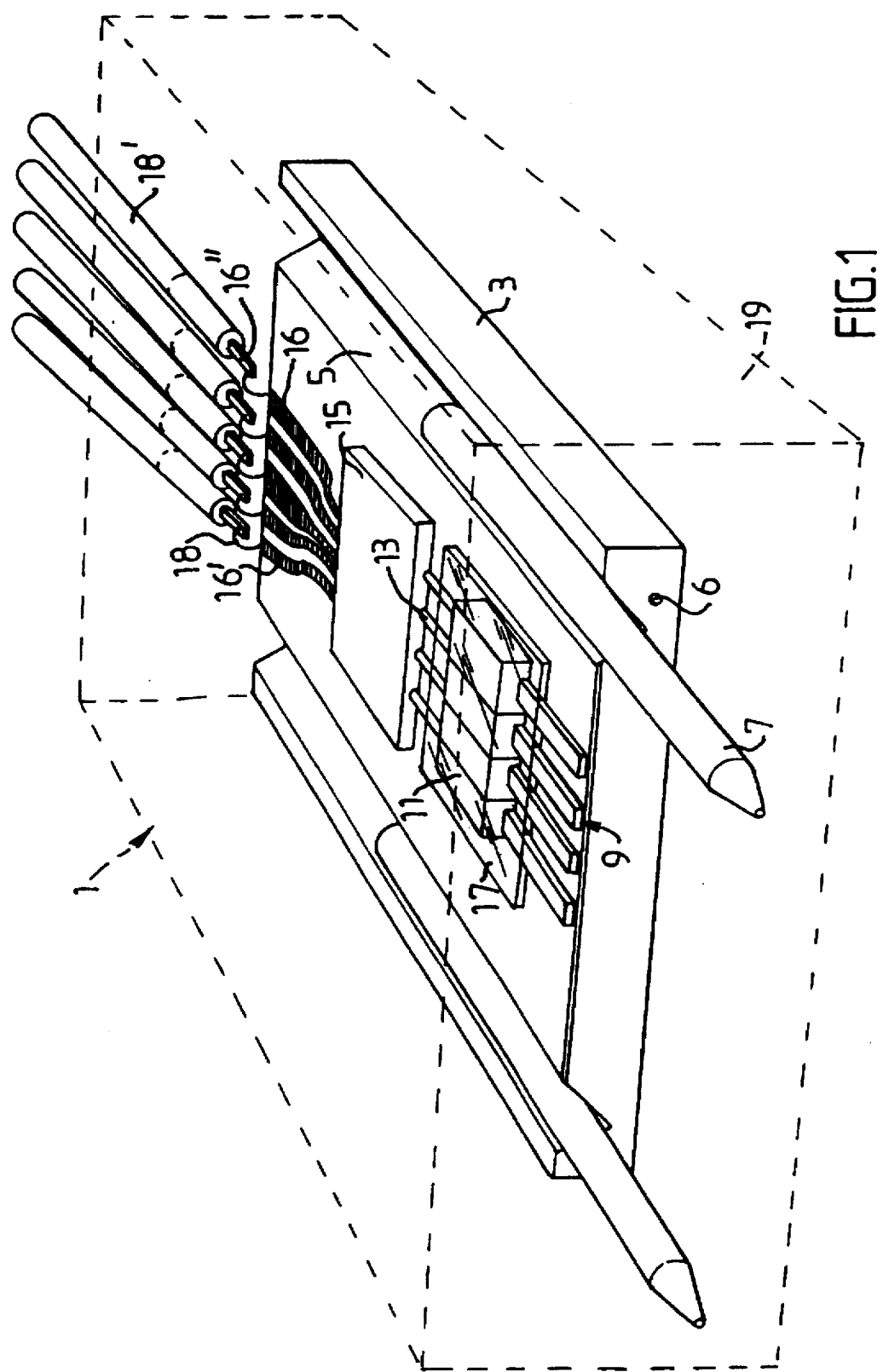
FIG. 1 is a schematic perspective view of an encapsulated optocomponent.

FIG. 1 is a perspective view of an encapsulated optocomponent 1, which contains a silicon substrate 3, for instance a rectangular plate cut from a single-crystal silicon wafer. On one, the top surface of the silicon plate 3 guide grooves 5 are arranged which extend along two opposite edges of the plate 3 and they are thus perpendicular to a front edge 6 of the plate. The guide grooves 5 have a cross section which in the illustrated embodiment is shaped as a symmetrical angle and the sides of which form an angle of about 45–65 degrees to the top surface of the silicon substrate 3. The guide grooves 5 act as guides for two cylindrical guide pins 7, which can be extractable and insertable as in conventional MT connectors.

Further, there are on the silicon plate 3 wave guides 9 extending from the front edge 6 of the plate 3 up to an optoelectronic active or passive component 11, located somewhere in the inner portion of the surface of the plate 3. The waveguides 9 are parallel to each other and are located centrally between the guide grooves 5, which also are parallel to each other, and the waveguides are parallel thereto and perpendicular to the front edge 6. Hereby, from or to the front edge 6 of the silicon plate 3, light can be guided in the waveguides 9 from or to respectively another optoelectronic capsule or component (not shown), which at its front side is shaped in a complementary or corresponding way and which is intended to be placed abutting or in engagement with the optocomponent 1 and be guided in a correct position by the guide pins 7.

The optoelectronic component 11 can be a circuit chip, which itself is produced by means of process technological methods used within the field of producing integrated electronic circuits, and is in a suitable way attached to the silicon base 3 and is electrically connected through connecting conductors 13 to driver electronic circuits in the shape of a unit 15, which is also located and attached to the same surface of the silicon plate 3. The driver unit 15 is electrically connected to conductor paths 16 on the top surface of the silicon plate 3. The conductor paths 16 has suitably shaped contact areas 16', to which conducting wires 18 are soldered. The wires 18 are in electrical contact with exterior electrical conductors in the shape of cables 18' through connector pins 16".

The guide grooves 5, at least portions of the waveguides 9 and the electrical conductor paths 16 can be produced by process technological methods conventional within the field of integrated microelectronic circuits (for instance etching, coating methods of various kinds such as deposition, oxidation, etc.).

In the manufacture of the encapsulated optocomponent 1 first a silicon base according to FIG. 1 is produced comprising guide grooves 5 and for instance the lower portions of or the whole waveguides 9, by for instance processing the silicon plate 3 by means of suitable process methods. The driver electronic circuits 5 and the optoelectric component 11 are mounted and connected to each other by means of the conductors 13. The driver electronic circuit unit 15 is connected to the conductor paths 16.

On top of at least a portion of these components a silicon dioxide layer 17 is deposited. The region where the silicon dioxide layer 17 is coated can be, as is illustrated in the Figure, the inner ends of the waveguides 9, which are located centrally or at the inner portion of the silicon wafer 3, and the optoelectronic component 11. The deposition of the silicon dioxide layer 17 also on the optoelectronic component 11 can generally be made without any problems since it in most cases is made of the same types of materials as the plate 3. Only deposition methods can be used which do not require a high temperature since too high temperatures can damage semiconducting transition regions within the active or passive optoelectronic component 11. Also the large mechanical stresses which can be induced at high temperatures can be damaging to the devices on the surface of the silicon base 3. Among the available deposition methods methods such as gas-plasma at a low temperature ("LTGP, Low Temperature Gas Plasma") and chemical deposition at a low pressure ("LPCVD, Low-Pressure Chemical Vapour Deposition") can be mentioned.

The silica layer 11 gives an impermeable encapsulation of the most sensitive regions of the surface of the silicon plate 3 together with the delicate components placed thereon. The silicon dioxide layer 17 can also give a good optical coupling between the inner ends of the waveguides 9 and the optoelectronic component 11, and thus the silicon dioxide layer 17 as a minimum must cover the connecting regions therebetween.

It is also possible to arrange a polymer layer between the surface of the plate 3 and the silicon dioxide layer 11. Such a polymer layer should be of a rather soft and elastic material in order to accommodate mechanical stresses arising at changing temperatures, for instance in the operation of the optoelectronic component 11.

In the guide grooves 5 on the silicon base 3 then the guide pins 7 are placed or possibly other devices which have the same shape as the guide pins in the region where they are positioned inside the encapsulated optocomponent 1. The electrical contact pins 16" are connected to the conductors 18. Finally the assembly formed in that way is covered by molding of a suitable, preferably dark coloured or opaque, mechanically resistant material 19 in the same way as in encapsulating conventional integrated electronic circuits, for instance with a curable resin and by transfer molding or low-pressure injection molding thereof. In this covering by molding at least that area of the top surface of the silicon base 3 is covered, where the guide grooves, the waveguides, the optocomponent and preferably also the driver electronic circuitry unit 15 and the electrical connections thereof are located. Advantageously however, the whole silicon substrate 3 together with its various devices except the front surface 6, where the guide grooves 5 for the guide pins 7 end and where the waveguides 9 start and where a connection to an optical unit having a complementary shape is to be made for coupling optical signals, is covered by molding.

Figure 2:
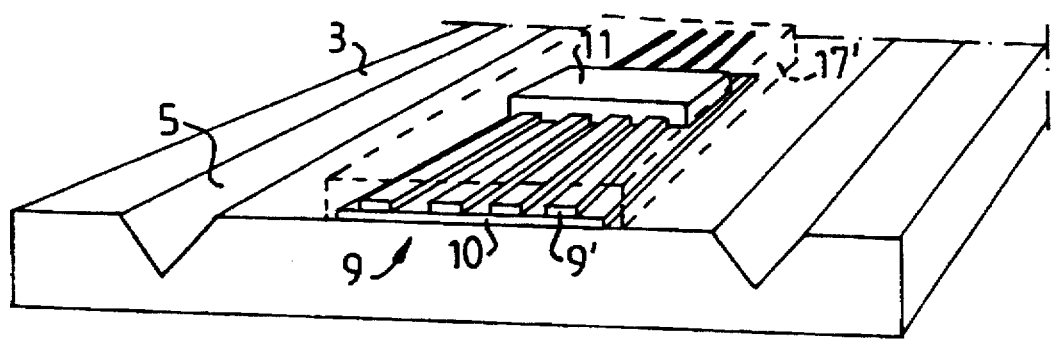
FIG. 2 is a perspective view of the front portion of a silicon substrate having devices arranged thereupon.

In FIG. 2 a perspective view of the front portion of the silicon substrate 3 is shown according to an embodiment, where the waveguides are formed of waveguide cores 9' having a rectangular cross section and a cladding enclosing the cores and formed of a layer 10 directly arranged on or in the surface of the silicon substrate 3 and the silica layer 17', which extends all along the waveguide cores 9' and surrounds them at the sides and on the top thereof. The waveguide cores 9' and the cladding portion 10 can be produced by means of process technological methods such as by deposition or similar methods of suitable materials on, oxidation of, etc. the surface of the silicon substrate 3, patterning by means of masks and etching, doping, etc. The silicon dioxide layer 17' is as above also arranged on top of all of the optoelectric component 11 and over the connecting region between the interior ends of the waveguide portions and thereby forms also an upper cladding portion of the waveguides 9. An encapsulation is finally made as above with a covering by molding in a protective, mechanically resistant material.

The waveguide portions 9' and 10 can also in special cases be of a suitable polymer material, for instance a polyimide, and are then obtained by extruding a polymer layer on the surface of the plate 3 and by then patterning the layers. Then also an upper cladding portion, not shown, of a suitable polymer material can be arranged as an upper cladding portion.

Figure 3:
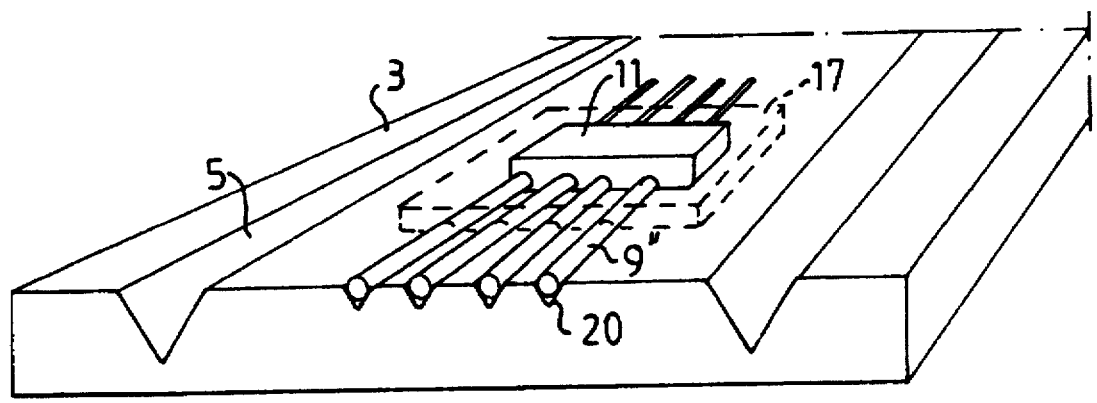
FIG. 3 is a perspective of the same kind as FIG. 2 of the front portion of a silicon substrate in an alternative embodiment.

The waveguides 9 can further be of a discrete nature and such an embodiment is illustrated by the perspective view of FIG. 3 of the front portion of the silicon substrate 3. In this embodiment there are guide grooves 20 produced in the surface of the silicon base 3 and they are located centrally between and in parallel to the guide grooves 5 for the guide pins and extend up to the front surface or abutment surface of the silicon base 3. The guide grooves 20 for the waveguides can have the same general cross section as the guide grooves 5 for the guide pins but have generally much smaller dimensions and can also be produced by process technological methods. The waveguides are here formed by segments 9" of optical fibers, preferably silica fibers. On top of all of the optical, active or passive component 11 and its connection region to the interior ends of the optical fibers 9", these ends being located inside the finished encapsulated component, is as above the silicon dioxide layer 17 deposited. The whole assembly is as above mechanically encapsulated with a resistant plastics material.

Figure 4:
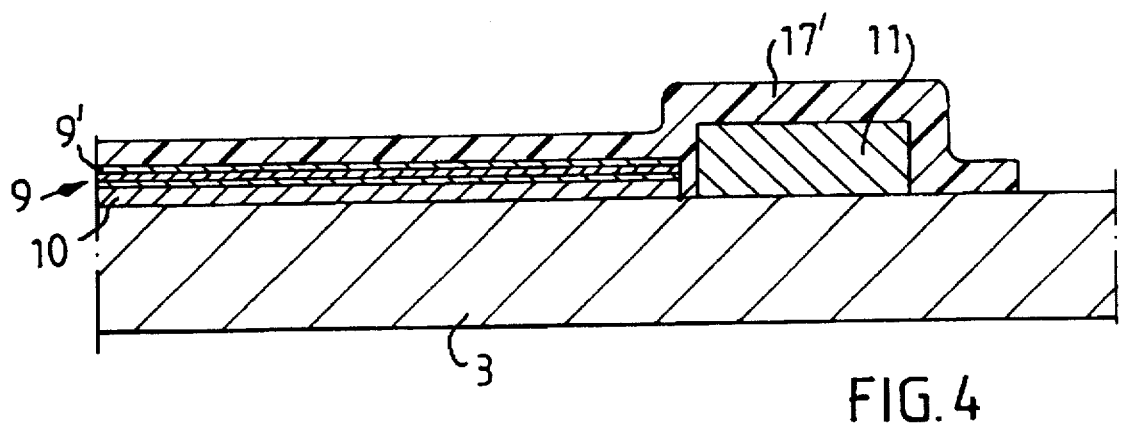
FIG. 4 is a partial section of the silicon substrate of FIG. 2.

FIG. 4 is a partial section of the silicon wafer 3 together with the deposited silicon dioxide layer 17' in the embodiment of FIG. 2. The encapsulating resistant plastics material 13 is, as above, not shown in this Figure. Thus it is illustrated here how a waveguide 9 comprises a lower cladding layer 10, which is deposited directly on the surface of the silicon base 3. On top of this layer waveguide cores 9' are deposited in the shape of elongated, stripshaped areas, see also FIG. 1. The upper portion of the cladding of the wave guide 9 is the finally deposited silica layer 17'. The refractive indices in the layers 10 and 17 and in the cores 9' are adapted by conventional methods in a suitable way to give desired waveguiding characteristics.

The silicon dioxide layer 17' also acts to prevent the protective, exterior resistant plastics material 19 (see FIG. 1) from penetrating between the interior ends of the waveguides 9 and the optoelectronic component 11, as appears from this Figure. Thereby also, as has been already observed, the optical contact between the ends of the waveguides 9 and the optocomponent unit 11 is secured.

Figure 5:
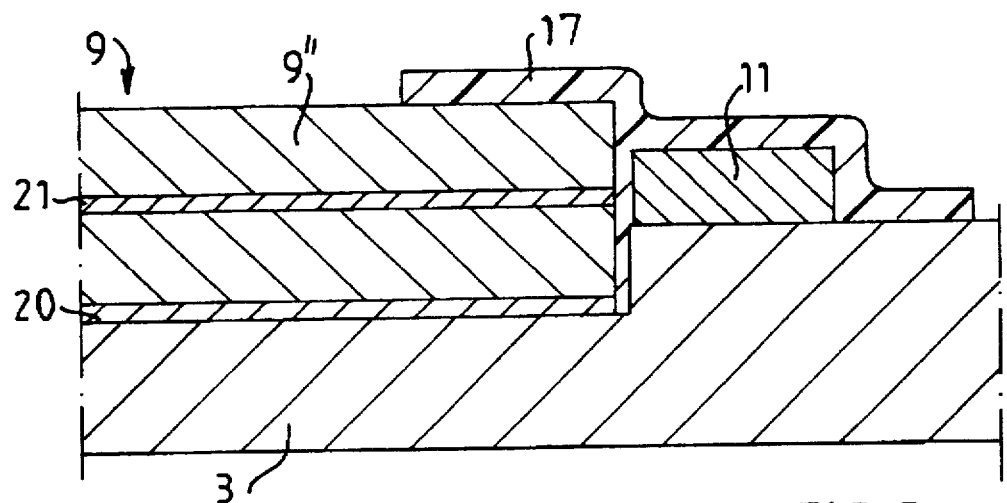
FIG. 5 is a partial section of the silicon substrate of FIG. 3.

In the same way as in FIG. 4, FIG. 5 is a partial section of the silicon plate together with the deposited silicon dioxide layer 17 according to the embodiment of FIG. 3. A waveguide 9 is formed by an optical fiber 9" having a fiber core 21 and the fiber 9" is located in and accurately positioned by its guide groove 20. The deposited silicon dioxide layer 17 covers the connection region between the interior fiber end and the optoelectric unit 11.

We claim:

1. A method of manufacturing an optocomponent, comprising the steps of:

producing on a surface of a plate of inorganic material various regions by process technological methods for at least partly forming at least one waveguide, attaching a discrete optoelectric component to said surface of the plate so that it is optically coupled to an end of said at least one waveguide, coating on top of at least a connection region between the end of said at least one waveguide and the optoelectrical component a silicon dioxide layer, molding the assembly thus formed in a curable resin.

2. A method according to claim 1, wherein a plurality of waveguides are formed and the silicon dioxide layer is also coated on top of portions of said plurality of waveguides for forming a cladding portion of the waveguides.

3. An optocomponent including waveguides and an optoelectric component, comprising:

a plate of inorganic material including a plurality of regions produced on a surface by process technological methods for at least partly forming at least one waveguide, a discrete optoelectric component arranged on said surface of the plate and optically coupled to an end of said at least one waveguide, a silicon dioxide layer disposed on top of at least a connection region between the end of said at least one waveguide and the optoelectric component, and an exterior coating of a plastics material sealingly connected to at least said surface of the plate, and covering an exterior surface of the silicon dioxide layer and at least partly enclosing the at least one waveguide.

4. An optocomponent according to claim 3, wherein the silicon dioxide layer also covers regions of said at least one waveguide for forming a cladding portion of said at least one waveguide.

5. An optocomponent according to claim 3, wherein the at least one wave guide includes cladding portions produced by process technological method on or in the surface of the plate and cores produced by process technological method at the surface of these cladding portions.

6. An optocomponent according to claim 3, wherein the at least one wave guide comprises optical silica fibers.

7. An optocomponent according to claim 3, wherein the surface of the plate includes guide grooves produced by process technological methods for at least of supporting guide pins and positioning of waveguides.

8. The method according to claim 1, wherein the inorganic material comprises one of silicon and ceramic material.

9. The method according to claim 1, wherein the step of coating with a silicon dioxide layer includes coating an entire top of the optoelectrical component.

10. The method according to claim 1, wherein the silicon dioxide layer coating is formed by deposition.

11. The optocomponent according to claim 3, wherein the inorganic material comprises one of silicon and ceramic material.

12. The optocomponent according to claim 3, wherein the silicon dioxide layer covers entirely a top of the optoelectrical component.

* * * * *